United States Patent [19]

Yazawa et al.

[11] 4,349,500
[45] Sep. 14, 1982

[54] METHOD FOR STRETCHING A FIBROUS OR FILM-LIKE MATERIAL

[75] Inventors: Masahide Yazawa, Kunitachi; Haruhisa Tani; Kazuhiko Kurihara, both of Tokyo; Hiroshi Yazawa, Kunitachi, all of Japan

[73] Assignees: Nippon Petrochemicals Co., Ltd.; Polymer Processing Research Institute, Ltd., both of Japan

[21] Appl. No.: 133,146

[22] Filed: Mar. 24, 1980

[30] Foreign Application Priority Data

Mar. 22, 1979 [JP] Japan .................................. 54-34027

[51] Int. Cl.³ ............................................. B29C 17/02
[52] U.S. Cl. ...................................... 264/159; 26/88; 264/154; 264/288.8; 264/290.2
[58] Field of Search .................. 264/290.2, 235.8, 154, 264/159, 288.8; 26/72, 88, 90

[56] References Cited

U.S. PATENT DOCUMENTS

| | | | |
|---|---|---|---|
| 2,988,772 | 6/1961 | Horn | 26/88 |
| 3,254,148 | 5/1966 | Nicholo | 264/290.2 |
| 3,581,344 | 6/1971 | Sederlund et al. | 264/290.2 |
| 3,807,004 | 4/1974 | Andersen | 264/290.2 |

Primary Examiner—James B. Lowe
Attorney, Agent, or Firm—Robert E. Burns; Emmanuel J. Lobato; Bruce L. Adams

[57] ABSTRACT

A method is disclosed for transversely stretching a fibrous or film-like material. The material is subjected to a monoaxial transverse stretch which progresses divergently along an arcuate track. An apparatus to implement this method is also disclosed, which essentially comprises a pair of pulleys and a pair of V-belts cooperating in releasably gripping therebetween opposite selvages of a given material, the pulleys being rotative in the same plane in opposite directions so that the material is stretched along a progressively diverging arcuate track.

4 Claims, 8 Drawing Figures

METHOD FOR STRETCHING A FIBROUS OR FILM-LIKE MATERIAL

BACKGROUND OF THE INVENTION

1. Field of the Invention

This invention relates to a method of effecting a transverse stretch or elongation of a fibrous or film-like material and to an apparatus for carrying this method into practice.

2. Prior Art

There have been proposed many methods and apparatus for stretching a fibrous or film material monoaxially in the transverse direction. A typical example known in the art is a tentering system designed to grip the longitudinal edges or selvages of an elongate sheet material and stretch this material transversely while being heated. Such conventional devices are rather costly and space-consuming. Furthermore, they suffer from the drawback that the magnification of stretch of a given material, particularly where this material is non-fibrous such as a plastic film, is limited by the rupture which would take place at areas of the material where longitudinal stresses are created during progressive transverse stretching.

SUMMARY OF THE INVENTION

It is therefore a primary object of the present invention to provide a novel method of and apparatus for effecting a monoaxial (uniaxial), transverse stretching of a fibrous as well as film-like material which will eliminate the foregoing drawbacks of the prior art.

A more specific object of the invention is to provide a maximum, yet adjustable range of stretch by stretching a material transversely in an area defined by two diverging arcuate paths.

Briefly stated, the method according to the invention comprises gripping the material at each of its opposite selvages between a rotating pulley and a moving endless belt engaged therewith; stretching the gripped material, while being heated, transversely in an area defined by two divergent arcuate paths or lines of engagement between the pulleys and the belts over a predetermined circumferential distance of from approximately a quarter to approximately a half of the full circumference of the pulleys; and releasing the stretched material for cooling to set.

These and other objects and features of the invention will become manifest by referring to the following detailed description taken in connection with the accompanying drawings which illustrate by way of example some preferred embodiments which the invention may assume in practice.

DETAILED DESCRIPTION

Figure 1:
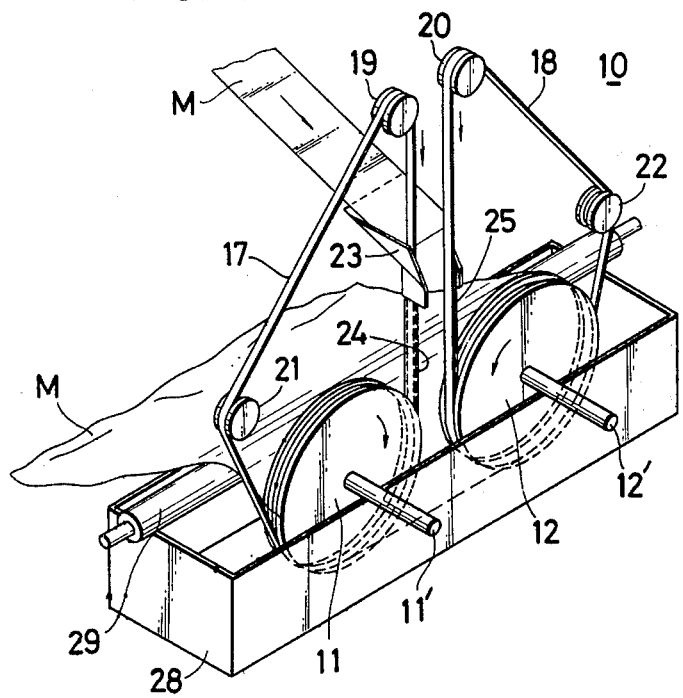
FIG. 1 is a perspective view of a transverse stretching apparatus constructed in accordance with the invention.
Figure 3:
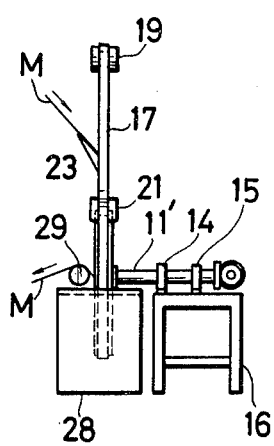
FIG. 3 is a side elevation of the same.

Referring now to the drawings and FIG. 1 in particular, there is shown a transverse stretching apparatus 10 embodying the invention. The apparatus 10 comprises a pair of pulleys 11,12 of substantially the same dimensions disposed symmetrically in horizontal alignment across a reference center line 13 and rotative in the same plane but in opposite directions as indicated by the arrows. For purposes of illustration, the pulleys 11,12 are shown to be rotative in a substantially vertical common plane, although this plane of rotation may be varied anywhere between perpendicular to horizontal. Rotation in the vertical plane as shown is preferred for reasons of spacesaving and ease of installation. The pulleys 11,12 are rotatably supported on their respective shafts 11',12' extending horizontally and supported via bearings 14,15 on a rack 16, as shown in FIG. 3. A pair of endless belts 17 and 18 of a "V" cross section are trained around the pulleys 11 and 12 respectively and around first guide rollers 19,20 and second guide rollers 21,22, respectively.

Either the pulleys 11,12 or the belts 17,18 or both may be driven by a source of drive or associated actuating means (not shown), but in any event the pulleys 11,12 must be rotated at substantially the same peripheral speed to effect uniform stretching of a material M.

Figure 4:
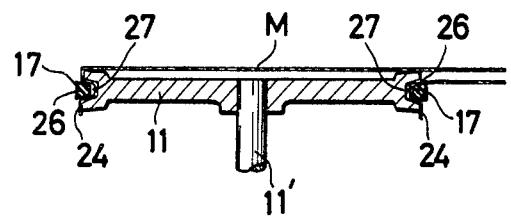
FIG. 4 is a cross-sectional view taken along the line IV—IV of FIG. 2.

In the apparatus shown in FIGS. 1-4, the material M to be stretched is in the form of an elongate sheet having a predetermined width. The sheet material M is fed to the apparatus 10 along the belts 17, 18 which are moving downwards substantially vertically to the apparatus 10, and is bent along both selvages thereof inwardly against the belts 17,18 by a suitable selvage folding means such as is shown at 23. The folded selvages 24,25 of the sheet M are then introduced between the pulleys 11,12 and the belts 17,18, respectively, and are each gripped by the V-section 26 of each belt engaging into a groove 27 formed in the periphery of each pulley, the groove 27 being complimentary in shape to the V-section 26, as shown in FIG. 4. The sheet M thus gripped is subjected to transverse stretching which progresses in an area defined by two divergent paths or lines of engagement between the respective pulleys and belts over a predetermined circumferential length or distance of the pulley 11,(12) measuring between the point of contact of the belt 17,(18) with the pulley 11,(12) and the point of departure of the belt 17,(18) from the pulley 11,(12). The length of these arcuate paths may be varied according to the extent to which the material M is stretched as desired and may normally range from a quarter to half of the full pulley circumference. The magnification of stretch is thus determined by the range of the arcuate path which may be chosen for an effective transverse length d of the material M, and it may be controlled expediently by adjusting the distance between the shafts 11' and 12' of the pulleys 11 and 12 of a given diameter as well as the angular position of the second guide rollers 21 and 22 relative to the axes of the pulleys 11 and 12, respectively.

The sheet material M gripped between the belts 17,18 and the pulleys 11,12 is subjected to a relatively low tension during its movement in the area between the first quarters of the circumference of the pulleys where the stretching force is applied by the belts 17,18. As the material M advances into the second quarter region of the pulley circumferences, and travels in a reverse direction, the magnification of stretch increases with an increase in the tension which in this region is applied by the pulleys, the selvages 24, 25 of the material being held against the rigid peripheries of the pulleys. This ensures stable anchoring of the material M in place between the belts and the pulleys, eliminating the tendency of the gripped selvages 24,25 of the material M to slip out of engagement therebetween.

The first guide rollers 19,20 are positioned such that the opposite selvages 24,25 of the material M to be gripped on entry to the apparatus 10 may extend substantially in parallel relation.

Figure 2:
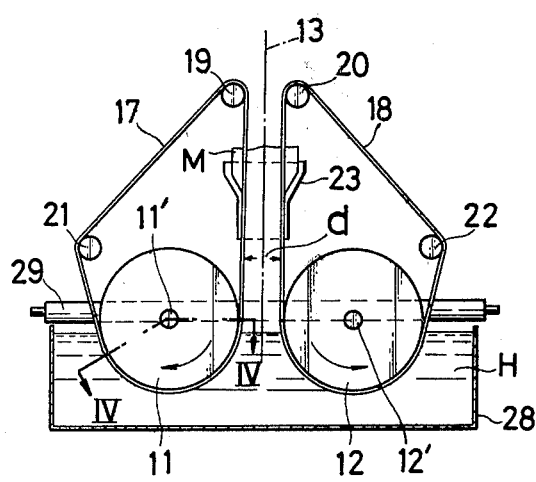
FIG. 2 is a front elevation of the apparatus of FIG. 1.

Designated at 28 is a vessel containing a liquid heating medium H to a level substantially flush with the axial line of the pulley 11,(12), as shown in FIG. 2.

There is provided a roll member 29 disposed behind the pulleys 11,12 opposite to the rack 16, the member 29 being adapted to withdraw the stretched portion of the material M after it has undergone substantially a semi-circumferential stretching under heated conditions.

Figure 5:
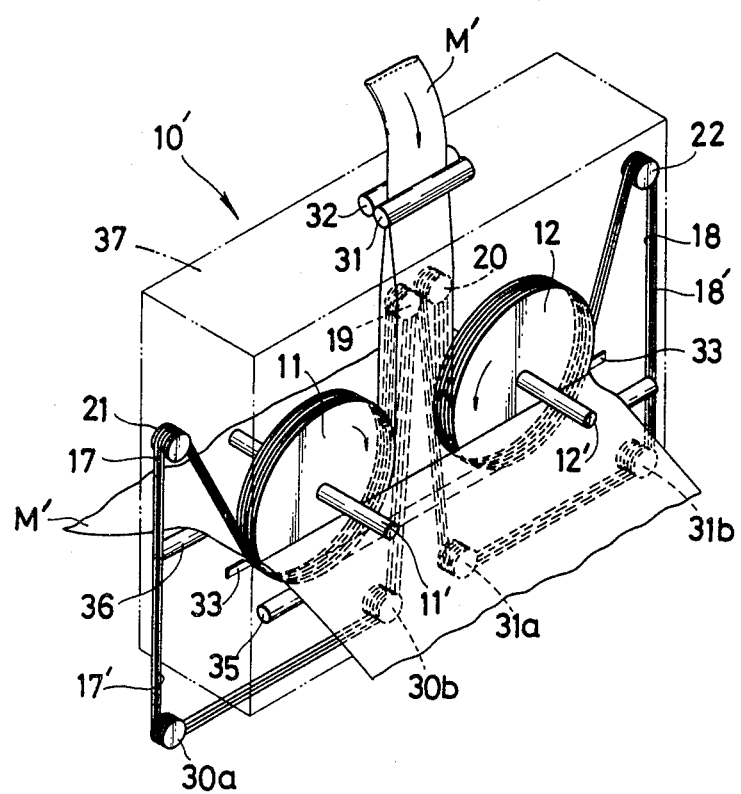
FIG. 5 is a modified form of apparatus according to the invention.
Figure 6:
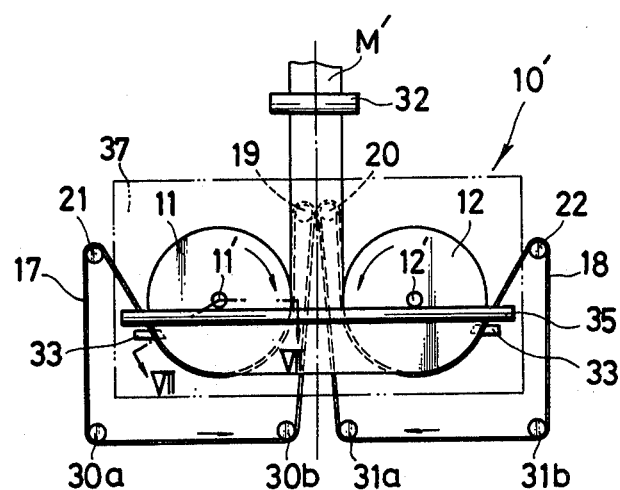
FIG. 6 is a front elevation of the same.
Figure 7:
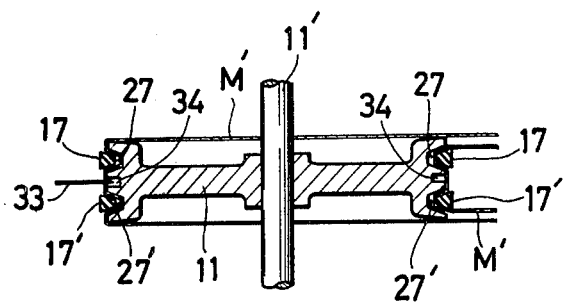
FIG. 7 is a cross-sectional view taken along the line VII—VII of FIG. 6.

Illustrated in FIGS. 5–7 inclusive is a modified form of transverse stretching apparatus 10' according to the invention, wherein the same reference numerals and characters are used to refer to the same or like parts as appear in FIGS. 1–4.

The endless V-belt 17,(18), as shown in FIGS. 5 and 6, is arranged to maintain engagement with a substantially semi-circumferential area of the pulley 11,(12) as in the case of the embodiment described hereinabove. The belts 17,18 are trained around the first guide rollers 19,20 and the secoond guide rollers 21,22, respectively, and further around additional sets of rollers 30a,30b and 31a,31b that are disposed in horizontal alignment below their respective associated pulleys 11,12.

The modified apparatus 10' functions basically in the same way as the first embodiment 10, but is particularly useful for handling a fibrous or film-like material M' of a tubular form, for which purpose there is provided an additional endless V-belt 17',(18') for engagement with a corresponding additional groove 27' formed in the periphery of the pulley 11,(12). A flattened tubular material M' is fed between pinch rollers 31,32 and advanced into the apparatus 10', whereupon the tube M' encases or envelops the first guide rollers 19,20 and a portion of each of the endless belts 17,(17') and 18,(18'), so that the tube M' is spread to permit portions of its periphery (corresponding to selvages 24,25) to be gripped in place from both inside and outside between the dual belts 17,(17'),18,(18') and the dually groove pulleys 11,12 as shown in FIGS. 5 and 6. The tube material M' then undergoes monoaxial, transverse stretching in the manner already described.

There is provided a cutter 33 in the path of each of the belts 17,(18) adjacent to the position where the belts 17,18,(17',18') depart from the pulleys 11,12, or the stretching of the material M' terminates. Each of the cutters 33 is received in a recess 34 formed in the periphery of each of the pulleys 11,(12) between the dual grooves 27,27'. The cutter 33 is adapted to sever the selvage portions of the tube M' upon completion of the intended stretching so that the tube M' is slit into two halves for withdrawal one over a roll member 35 at the front and the other over a roll member 36 at the back of the pulleys 11,12, respectively, as shown in FIG. 5.

Designated at 37 is a casing surrounding the pulleys 11,12 and accommodating a suitable heating medium such as live steam for heating the tubular material M'.

The heating medium in the practice of the invention may be liquid and steam, as illustrated.

The magnification or extent to which the material M' is to be stretched may be adjusted by varying the distance between the two pulley shafts 11' and 12' and the angular position of the second guide rollers 21 and 22 with respect to the axes of the pulleys 11 and 12, respectively, as described in connection with the first apparatus 10 shown in FIGS. 1–4.

It is known in the art that when a film is stretched monoaxially while it is allowed to contract freely transversely of the direction of stretch, the resulting stretched film has a thickness and a width each corresponding to $1/\sqrt{R}$ of the original where R is the magnification of stretch.

According to the inventive concept in which a starting film is subjected to transverse stretching while progressing in an area defined by two divergent arcuate paths, the film will undergo satisfactory monoaxial transverse stretching, if the condition of $\cos\theta < 1/\sqrt{\gamma}$ is met where $\theta$ is the angle of rotation of the pulley 11,(12) initiating at the horizontal line connecting the center axes of two parallel pulleys 11 and 12; $\gamma$ is the magnification of stretch; and a unit length (which is assumed to be 1) of the unstretched film is reduced to a length equal to $\cos\theta$ when the stretching has been completed.

However, if the condition is $\cos\theta > 1/\sqrt{\gamma}$ then the film receives, in addition to transverse stretch tension, another tension exerted in the longitudinal direction. In this case, the film can often become ruptured if the magnification of stretch is increased. It follows therefore that the pulleys must have a diameter such that the stretching terminates at a pulley position defined by $\cos\theta \leq 1/\sqrt{\gamma}$ where the belts are released from the pulleys. In such instance, the stretched film should be withdrawn at a rate of speed equal to or less than $1/\sqrt{\gamma}$ of the peripheral speed of the pulley and with care to hold the stretched film under minimum tension by, for example, providing a suitable warp material where the selvage portions of the film, which remain unchanged in length, sag.

It has now been found that transverse stretching can take place at an increased angle of rotation $\theta$, effectively utilizing the semicircumference of the pulley if an excess rate of unstretched film is fed in the form of a film with fine transverse creases or is fed by means of pulleys and belts each having mutually engaging teeth or corrugated surfaces for gripping of the film. Assuming that the rate of excess feed is K, the angle of rotation $\theta$ of the pulley without risk of film rupture lies in the range represented by the formula $\cos\theta \leq K/\sqrt{\gamma}$. It follows therefore that with the rate of stretch selected to be 9 times, the angle of rotation can be as great as $\theta = 180°$ at an excess feed rate $K=3$, as compared to the case where no such excess feed is provided in which instance the angle of rotation $\theta$ is as small as 109°.

Figure 8:
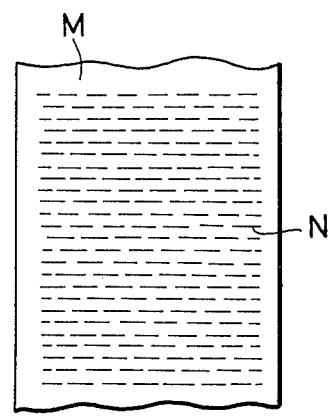
FIG. 8 is a partial plan view of a modified form of film material according to the invention.

It has also been found that transverse stretch of a film M material can be accomplished over substantially semicircumferential arcuate regions of the pulleys, as illustrated, by means of providing the film with a series of discrete slits or notches N extending transversely between opposite blank selvages of the film as shown in FIG. 8, the arrangement being that longitudinally directed tension or stresses may be eliminated. As an alternative, a film having a series of continuous, transversely extending slits or notches may be utilized.

Having thus described the invention, it will be understood that further modifications or changes may be made in the specific form of apparatus herein illustrated, as will appear obvious to those skilled in the art without departing from the scope of the appended claims.

We claim:

1. A method of transversely stretching a longitudinally running continuous strip of organic synthetic thermoplastic polymeric material, which comprises the steps of:
    (a) gripping the strip at its opposite selvages respectively between (i) the periphery of each of a pair of symmetrically disposed pulleys of substantially the same dimensions rotating at substantially the same peripheral speed in the same plane but in opposite directions and (ii) each of a pair of endless belts respectively trained around and running with said pulleys, said pulleys and said belts forming two divergent arcuate paths therebetween;
    (b) stretching the gripped strip, while being heated, transversely by moving the selvages along the respective arcuate paths over a predetermined circumferential distance of from approximately a quarter to approximately a half of the full circumference of said pulleys; and
    (c) releasing the stretched strip from between said pulleys and belts for cooling to set.

2. A method as claimed in claim 1, wherein the starting strip is in tubular form, is gripped at each of the selvage portions from both inside and outside between the respective pulley and belts while it is stretched, and is cut open at the selvage portions upon completion of the stretching.

3. The method as claimed in claim 1 or claim 2, wherein the strip is provided with a series of continuous slits extending transversely between opposite blank selvages thereof.

4. The method as claimed in claim 1 or claim 2, wherein the strip is provided with a series of discrete slits extending transversely between opposite blank selvages thereof.

* * * * *